(12) United States Patent
Hieda et al.

(10) Patent No.: US 6,278,486 B1
(45) Date of Patent: Aug. 21, 2001

(54) INFORMATION SIGNAL CONTROLLING SYSTEM

(75) Inventors: Teruo Hieda, Kanagawa-ken; Nobuhiko Shinoda, Tokyo; Koji Takahashi, Kanagawa-ken, all of (JP)

(73) Assignee: Canon Kabushiki Kaisha

( * ) Notice: Subject to any disclaimer, the term of this patent is extended or adjusted under 35 U.S.C. 154(b) by 0 days.

(21) Appl. No.: 08/396,079

(22) Filed: Feb. 28, 1995

Related U.S. Application Data

(63) Continuation of application No. 08/271,558, filed on Jul. 7, 1994, now abandoned, which is a continuation of application No. 08/158,159, filed on Nov. 24, 1993, now abandoned, which is a continuation of application No. 07/755,449, filed on Sep. 5, 1991, now abandoned.

(30) Foreign Application Priority Data

Sep. 18, 1990 (JP) .................................... 2-248015
Sep. 18, 1990 (JP) .................................... 2-248016
Sep. 18, 1990 (JP) .................................... 2-248017

(51) Int. Cl.$^7$ ........................... H04N 5/262; H04N 5/93; H04N 5/225

(52) U.S. Cl. .................... 348/239; 358/906; 386/117; 386/52

(58) Field of Search ................... 348/232, 239, 348/233, 207; 358/906, 909.1; 386/52, 117

(56) References Cited

U.S. PATENT DOCUMENTS 4,858,012 * 8/1989 Hino et al. .......................... 358/906
5,016,112 * 5/1991 Nakajima et al. .................. 358/906
5,124,814 * 6/1992 Takahashi et al. .................. 348/232

* cited by examiner

Primary Examiner—Andrew B. Christensen
(74) Attorney, Agent, or Firm—Robin, Blecker & Daley

(57) ABSTRACT

An information signal processing device comprises a data holding device which is removably attachable to an information signal generating device for generating a first information signal and which holds information data corresponding to a plurality of kinds of second information signal to be combined with the first information signal and which also holds control data for controlling the combining operation, whereby the second information signal can be combined with the first information signal without special operations.

13 Claims, 16 Drawing Sheets

FIG.7(A)

→A. TITLE
B. MUSIC
C. TITLE & MUSIC

FIG.7(B)

TITLE
→1. AAAA
2. BBBB
3. CCCC
4. DDDD

FIG.7(C)

MUSIC
→1. EEEE
2. FFFF
3. GGGG
4. HHHH

FIG.7(D)

TITLE & MUSIC
→1. AAAA & EEEE
2. BBBB & FFFF
3. CCCC & GGGG
4. DDDD & HHHH

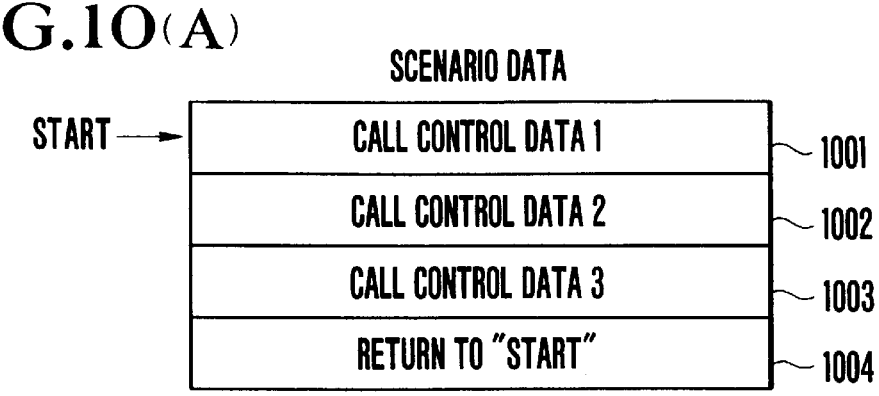
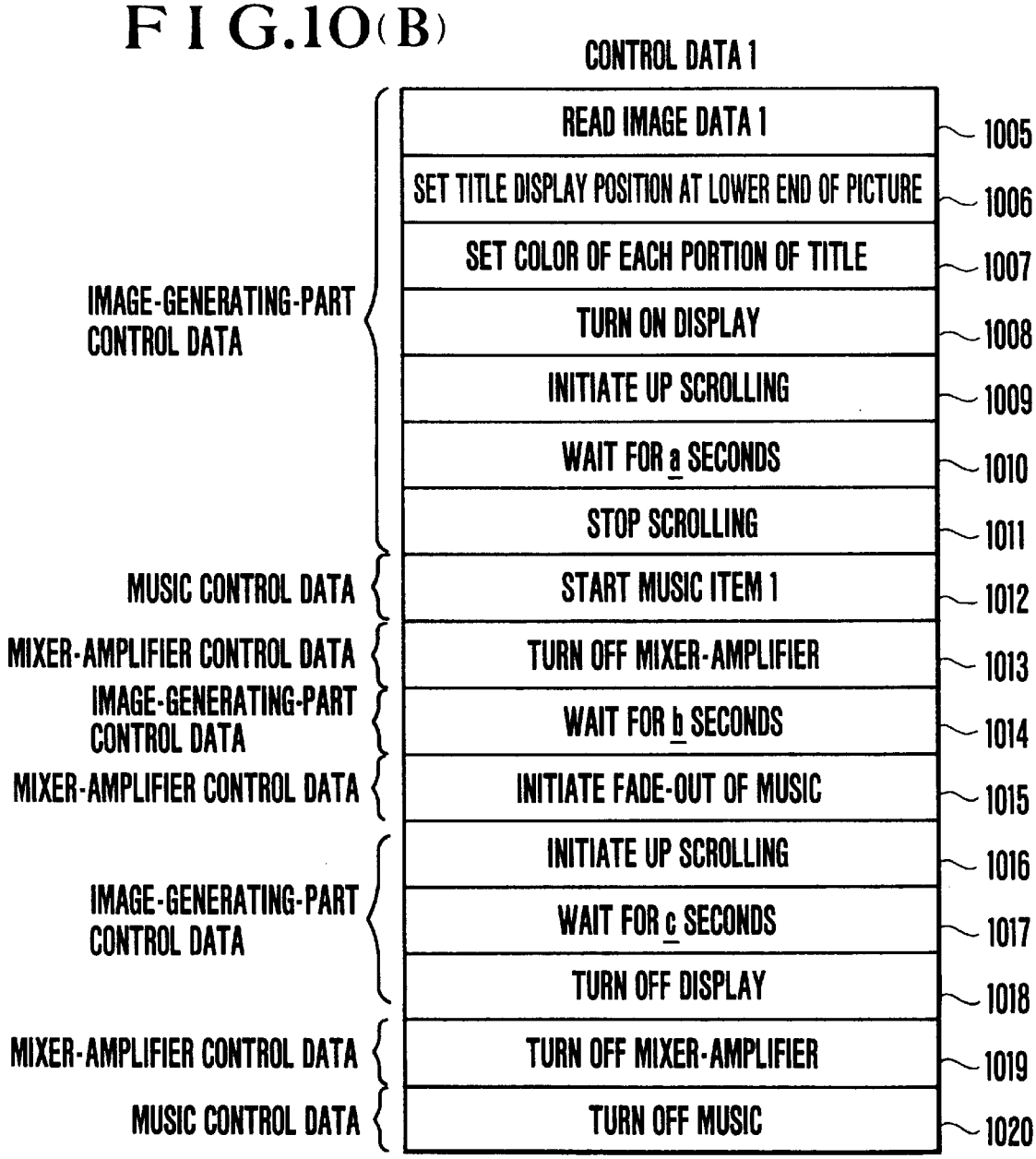

INFORMATION SIGNAL CONTROLLING SYSTEM

This is a continuation application under 37 CFR 1.62 of prior application Ser. No. 08/271,558 filed Jul. 7, 1994, now abandoned which is a continuation of Ser. No. 08/158,159 filed Nov. 24, 1993 (now abandoned), which is a continuation of Ser. No. 07/755,449, filed Sep. 5, 1991 (now abandoned).

BACKGROUND OF THE INVENTION

1. Field of the Invention

The present invention relates to an information signal controlling system having a data holding device which is removably attachable to an apparatus and which holds various kinds of data.

2. Description of the Related Art

Various methods have conventionally been considered in order to combine, as by superimposition, an image such as a character, a symbol or a specific graphic image with a video signal to be recorded on a recording medium for the purposes of enhancing image effects or in order to superpose background music or effect sound on an audio signal to be recorded on the recording medium, when the video or audio signal obtained by photography using a video camera or the like is to be recorded on the recording medium.

One method of combining a different image signal with a video signal obtained by photography makes use of, for example, a so-called character generator.

This method utilizes an arrangement consisting of a pattern ROM (read-only memory) which stores patterns such as characters and symbols to be displayed, a register which stores the kind of character to be displayed at each display position, and a reading part for reading the contents of the pattern ROM that correspond to the contents of the register and combining the read contents with a video signal, in accordance with horizontal and vertical sync signals. When a character is to be displayed, the kind of character to be displayed is written into a register for a desired display position by a microcomputer or the like.

Another method is to convert an image signal obtained by imaging using a video camera or the like into a digital image signal of the order of one to several bits by an A/D converter, to store the digital image signal in a memory for each display pixel, to sequentially read the contents stored in the memory in accordance with horizontal and vertical sync signals, and to combine the read contents, as a different image signal, with a video signal separately obtained by imaging using the video camera.

Still another method utilizes an arrangement consisting of a graphic memory having an address corresponding to each pixel position on a picture, a microcomputer for writing data at a display address among the addresses within the graphic memory, and a reading circuit for reading the contents stored in the graphic memory. In this method, the contents stored in the graphic memory are read in accordance with horizontal and vertical sync signals, and the read contents are combined as a different image signal with a video signal obtained by photography using a video camera.

A method of combining a different audio signal with an audio signal recorded during photography using a video camera is to prepare a device for generating an audio signal, such as a record player, a tape player or an electronic sound generator, and combine, as by a mixing amplifier, the audio signal generated by such a device with an audio signal recorded during or after photography.

However, as described above there is the disadvantage that the image combining device, which is needed when a different image signal is to be combined with a video signal obtained by photography is different from the sound combining device needed when a different audio signal is to be combined with a recorded audio signal. In addition, since a number of connecting wires are needed for connecting those devices, the connection between the devices and their operation become complicated with the result that an erroneous operation easily occurs and operability is impaired.

SUMMARY OF THE INVENTION

It is, therefore, an object of the present invention to provide an information signal controlling system which makes it possible to solve the above-described problems.

Another object of the present invention is to provide an information signal controlling system which is capable of combining one information signal with another information signal without a special operation.

To achieve the above-described objects, according to one aspect of the present invention, there is provided an information signal controlling system which comprises an information signal generating apparatus for generating a first information signal, and a data holding device which is removably attachable to the information signal generating apparatus and which holds information data corresponding to a second information signal to be combined with the first information signal generated by the information signal generating apparatus and holds control data for controlling an operation for combining the second information signal with the first information signal.

Another object of the present invention is to provide an information signal controlling system which is capable of arbitrarily combining one image signal with another image signal, or one audio signal with another audio signal, with an easy operation.

To achieve the above object, in accordance with another aspect of the present invention, there is provided: (1) an information signal controlling system which comprises an information signal generating apparatus for generating a first image signal and a first audio signal; and (2) a data holding device which is removably attachable to the information signal generating apparatus and which holds (a) image information data corresponding to a second image signal to be combined with the first image signal generated by the information signal generating apparatus, (b) audio information data corresponding to a second audio signal to be combined with the first audio signal generated by the information signal generating apparatus, and (c) control data having a (i) first combination mode for carrying out only the operation of combining the second image signal generated on the basis of the image information data with the first image signal, (ii) a second combination mode for carrying out only the operation of combining the second audio signal generated on the basis of the audio information data with the first audio signal, and (iii) a third combination mode for carrying out both the operation of combining the second image signal with the first image signal and the operation of combining the second audio signal with the first audio signal. A combining operation is controlled on the basis of any of the first, second and third combination modes of the control data.

Another object of the present invention is to provide an information signal controlling system which is capable of combining one image signal with another image signal, or one audio signal with another audio signal, in an arbitrary order, with an easy operation and without the need for a special operation To achieve the above object, in accordance with another aspect of the present invention, there is provided: (1) an information signal controlling system which comprises an information signal generating apparatus for generating a first image signal; and (2) a first audio signal, and a data holding device which is removably attachable to the information signal generating apparatus and which holds (a) information data corresponding to a second image signal and a second audio signal which are to be combined with the first image signal and the first audio signal, respectively, and which are generated by the information signal generating apparatus, (b) image combination control data for controlling a combining operation for the second image signal, (c) sound combination control data for controlling a combining operation for the second audio signal, (d) and control order specifying data for specifying a control order for the image combination control data and the sound combination control data.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 7(A) to 7(B) are views showing several examples of display pictures which are displayed in an EVF 21 in the second embodiment;

FIGS. 10(A) and 10(B) are views showing, respectively, one example of scenario data and that of control data according to the third embodiment.

DETAILED DESCRIPTION OF THE PREFERRED EMBODIMENTS

Preferred embodiments of the present invention will be described below with reference to the accompanying drawings.

Figure 1:
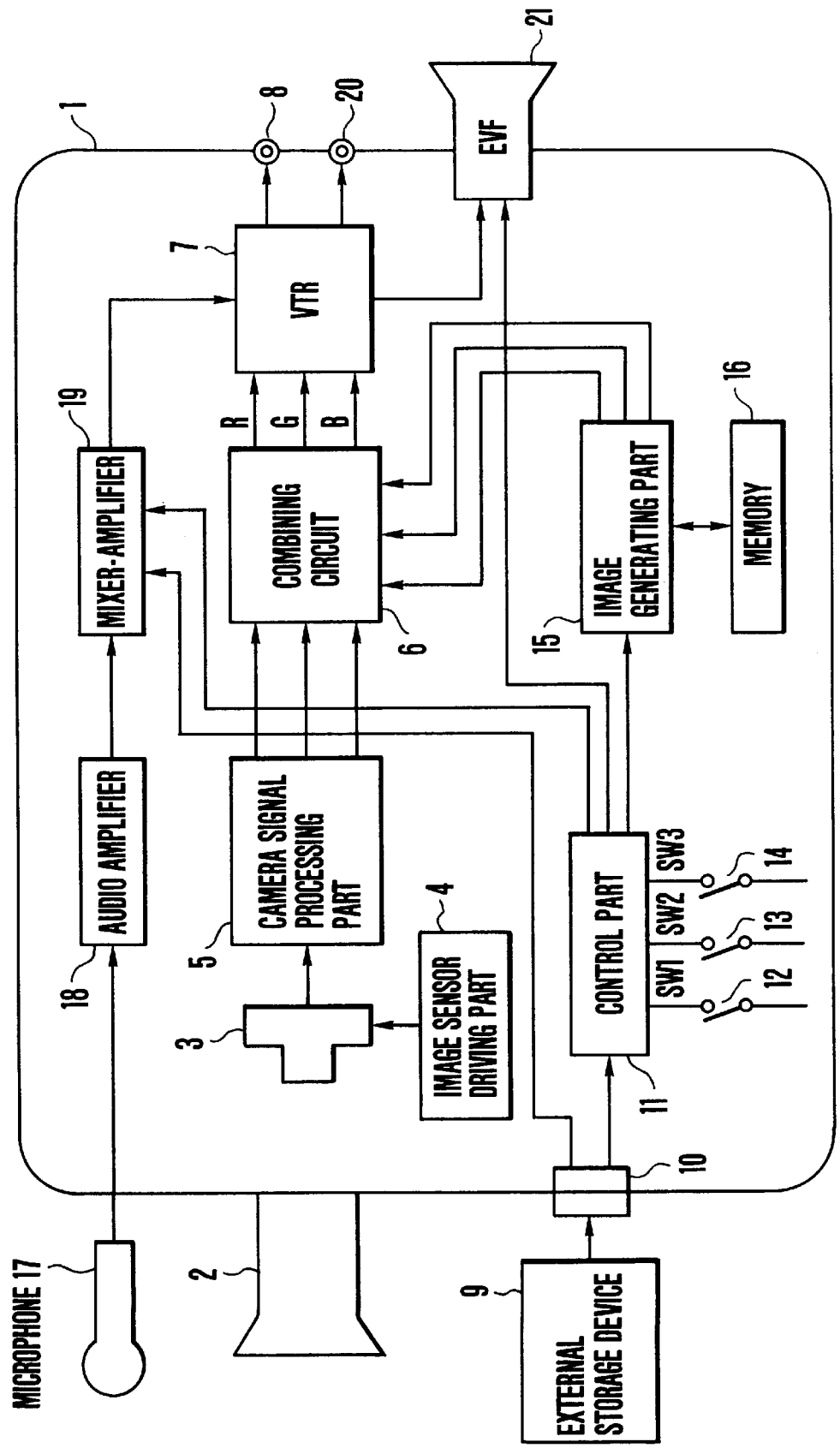
FIG. 1 is a block diagram diagrammatically showing the arrangement of a video camera system to which a first embodiment of the present invention is applied.

FIG. 1 is a block diagram diagrammatically showing the arrangement of a video camera system to which a first embodiment of the present invention is applied.

The video camera system shown in FIG. 1 comprises the following major elements: a body 1; an imaging lens 2; an image sensor 3; an image sensor driving part 4; a camera signal processing circuit 5; a combining circuit 6 for combining a title image signal with a video signal; a VTR part 7; an output terminal 8 for a video signal; an external storage device 9 which is removably connected to the body 1 of the video camera system; a connecting part 10 for providing connection between the external storage device 9 and the body 1; a control part 11 for executing control of the external storage device 9, transmission and reception of data, control of a mixer-amplifier 19, control of switches, display of information on an EVF (electronic viewfinder) 21, and so on; switches 12, 13 and 14; an image generating part 15 for generating a title image signal; a read/write memory 16 which holds only image data from among title data supplied from the external storage device 9; a microphone 17 which is attached to the body 1 for recording sound; an audio amplifier 18 for amplifying an audio signal; a mixer-amplifier 19 for combining an audio signal supplied from the external storage device 9 with a signal outputted from the audio amplifier 18, according to a control signal supplied from the control part 11; an audio signal output terminal 20; and the electronic viewfinder 21 for providing a visual display of an imaged or reproduced image during recording or reproduction or a visual display of character information indicative of the operational state of the system.

Referring to FIG. 1, a subject image (not shown) is formed on an image-sensing plane of the image sensor 3 by the imaging lens 2 and is then photoelectrically converted into a sensed video signal by the image sensor 3. This sensed video signal is supplied to the camera signal processing circuit 5.

At this time, the image sensor 3 is in operation, according to timing pulses outputted from the image sensor driving part 4.

The camera signal processing circuit 5 applies predetermined processing to the supplied video signal and then outputs the result to the combining circuit 6. In the combining circuit 6, the video signal is combined with a title image signal which will be described later, and is recorded on a recording medium such as a magnetic tape in the VTR part 7.

A video signal reproduced in the VTR part 7 during reproduction is outputted from the output terminal 8, and is supplied to an external apparatus such as a television monitor.

In the meantime, an audio signal outputted from the microphone 17 is amplified by the audio amplifier 18, and is then combined with an audio signal supplied from the external storage device 9, which will be described later, by the mixer-amplifier 19.

The audio signal outputted from the mixer-amplifier 19 is recorded on a predetermined audio track of the magnetic tape, or it is recorded together with the aforesaid video signal by being frequency-multiplexed with the video signal and recorded on a video track of the magnetic tape in the VTR part 7.

The control part 11 carries out transmission of data to the image generating part 15, control of the image generating part 15, transmission of image information signals such as characters to the EVF 21, and so on, in accordance with the states of the respective switches 12 to 14, the kind of, or the state of connection of, the external storage device 9 connected to the connecting part 10, data supplied from the external storage device 9, and so on.

The image generating part 15 writes the data supplied from the control part 11 into the memory 16. Also, the image generating part 15 reads out data held in the memory 16 to generate an image signal, according to a command supplied from the control part 11. In the combining circuit 6, this image signal, as described previously, is combined with the video signal supplied from the camera signal processing circuit 5.

The connecting part 10 is arranged so that various kinds of external storage devices can be selectively removably connected to the body 1.

Figure 2A:
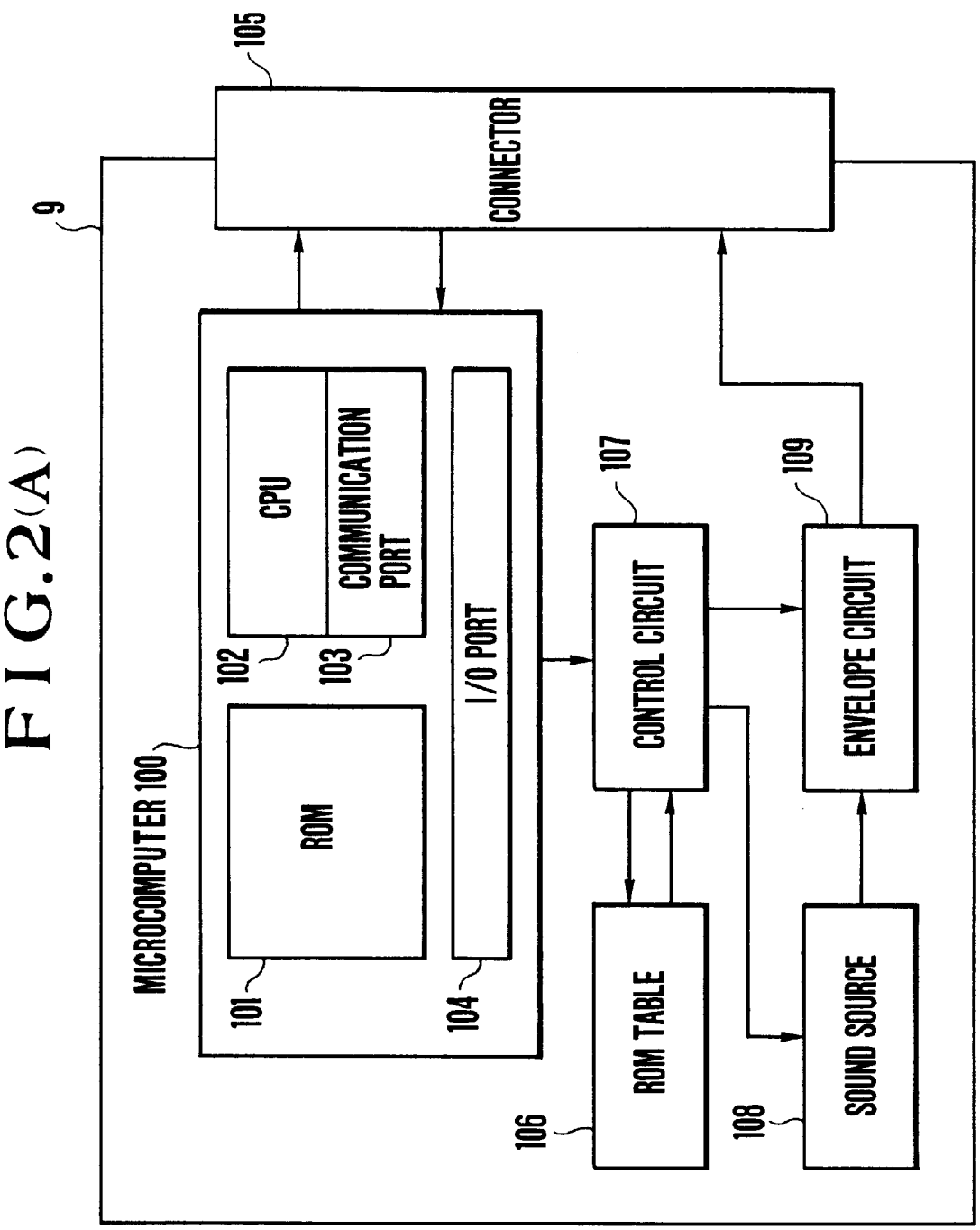
FIGS. 2(A) to 2(C) are explanatory views of the arrangement and operation of an external storage device 9 in the first embodiment.
Figures 2B, 2C:
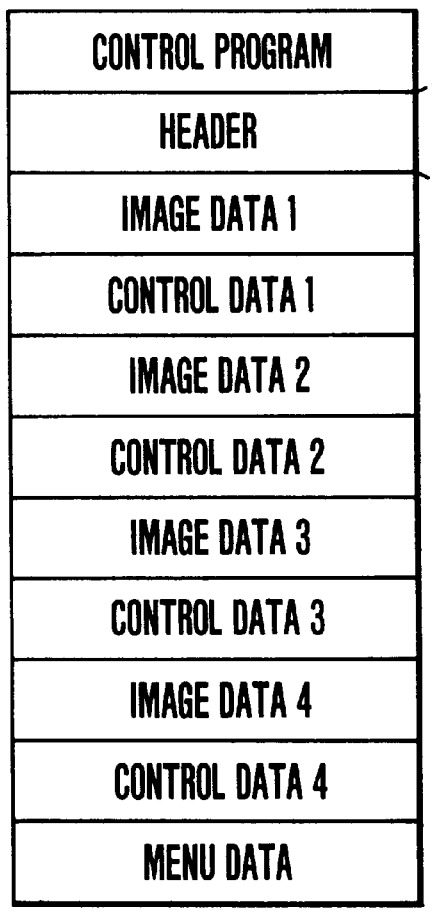

FIGS. 2(A) to 2(C) are explanatory views of the arrangement and operation of the external storage device 9 in the first embodiment, and FIG. 2(A) is a block diagram showing an example of the arrangement of the external storage device 9.

The external storage device 9 shown in FIG. 2(A) includes a microcomputer 100, a ROM 101 incorporated in the microcomputer 100, a CPU (central processing unit) 102, a serial communication port 103, an I/O port 104 for performing an input/output task, a connector 105 for providing electrical connection between the body 1 and the external storage device 9; a ROM table 106 which contains written data such as sound length, sound waveforms and the patterns of intervals of sound; a control circuit 107 for controlling the ROM table 106 for data reading, a sound source 108 which will be described later, an envelope circuit 109, and so on; and the envelope circuit 109 for varying the amplitude of an audio signal outputted from the sound source 108.

Referring to FIG. 2(A), if a command is sent from the body 1 to the external storage device 9 through the connector 105 and the communication port 103, the CPU 102 executes an operation according to the command, for example, reads data held in the ROM 101 and transmits the read data to the body 1 through the communication port 103 and the connector 105, or executes control of the I/O port 104.

To select or start/stop music, the control circuit 107 reads the contents held in the ROM table 106, according to a control signal supplied from the I/O port 104, and performs setting of the sound source 108 and the envelope circuit 109.

An audio signal generated by the sound source 108 is outputted to the body 1 through the envelope circuit 109 and the connector 105.

FIG. 2(B) is a view showing the contents of data held in the ROM 101 of FIG. 2(A).

As shown in FIG. 2(B), a control program for carrying out the aforesaid communication, interpretation of commands, reading of data, control of the I/O port 104, and so on, is stored at a leading address part. The control program is followed by a header which contains data such as the kind of external storage device, the number of titles stored therein and the leading address of each stored data. The header is followed by image data 1, control data 1, image data 2, control data 2, image data 3, control data 3, image data 4, and control data 4, which are stored in that order at corresponding address parts, as shown in FIG. 2(B). At an address part that follows, menu data for providing a menu display is stored.

FIG. 2(C) shows a display picture appearing in the EVF 21 when the external storage device 9 is connected to the body 1.

As shown in FIG. 2(C), "1" to "4" indicate data numbers, and "AAAA" to "DDDD" indicate the names and kinds of data which are displayed in the EVF 21 by the control part 11 according to the menu data shown in FIG. 2(B).

Figure 3:
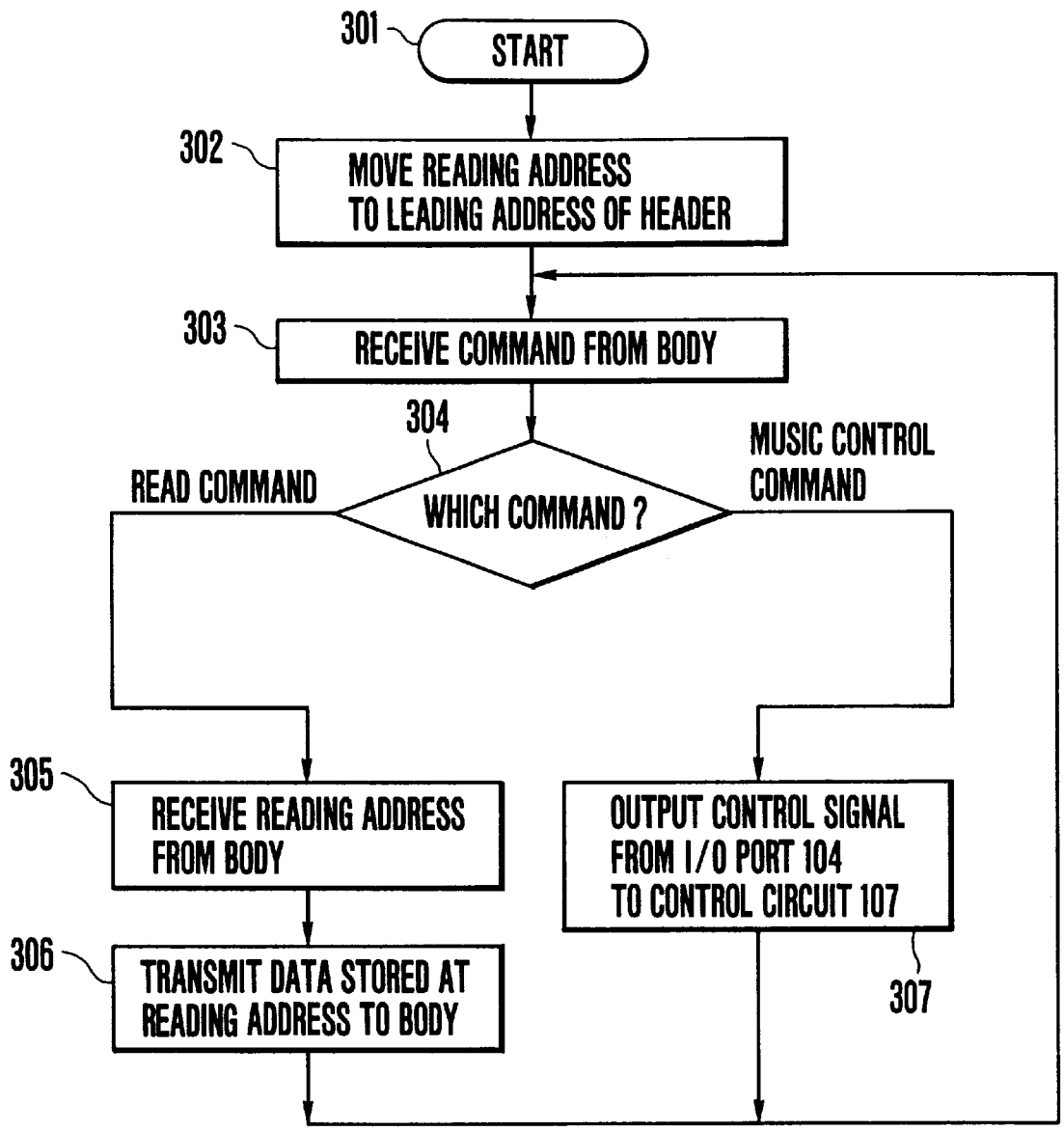
FIG. 3 is an operational flowchart of a microcomputer 100 incorporated in the external storage device 9 in the first embodiment.

FIG. 3 is a flowchart showing the operation of the microcomputer 100 incorporated in the external storage device 9.

As shown in FIG. 3, after the process has been started in Step 301, it proceeds to Step 302, where a reading address is moved to the leading address of the header so that the process is adapted to a kind-identifying operation performed in the body 1 as will be described later.

Then, in Step 303, a command from the body 1 is received and it is determined in Step 304 whether the command is a read command or a music control command. In the case of the read command, the process proceeds to Step 305, where a reading address is received from the body 1. In Step 306, the data stored at the reading address is read from the ROM 101 and transmitted to the body 1, and the process returns to Step 303.

If it is determined in Step 304 that the music control command has been received, the process proceeds to Step 307, where a predetermined control signal corresponding to the music control command is outputted to the control circuit 107 through the I/O port 104. The process returns to Step 303, and the above-described operation is repeated.

Figure 4A:
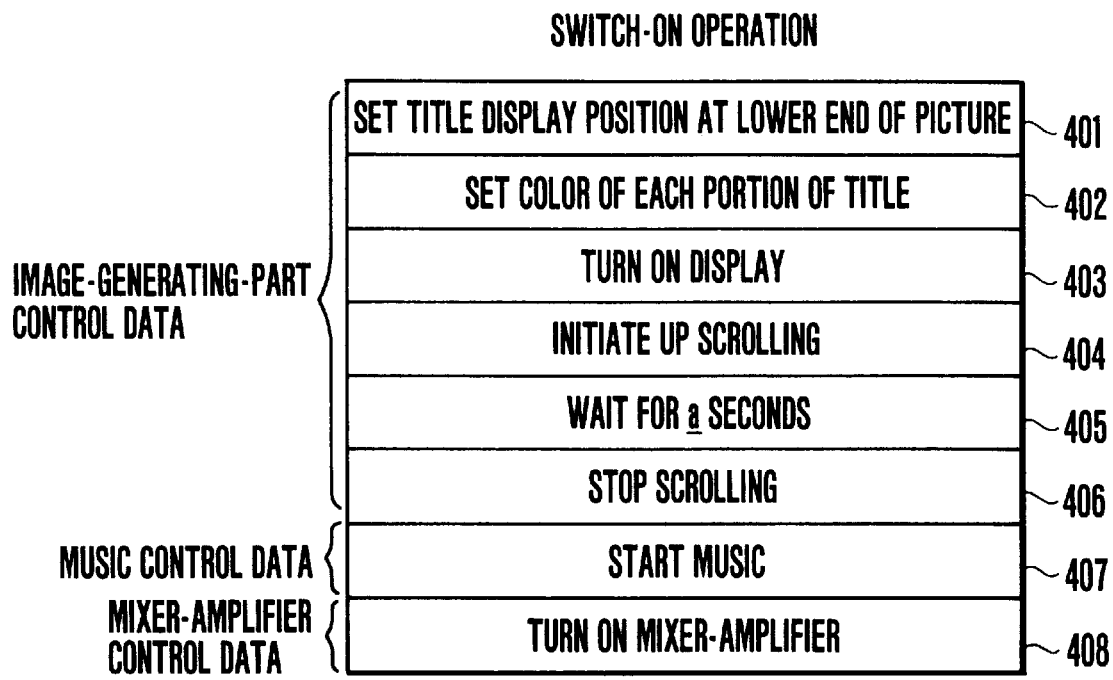
FIGS. 4(A) and 4(B) are views showing different examples of control data according to the first embodiment.
Figure 4B:
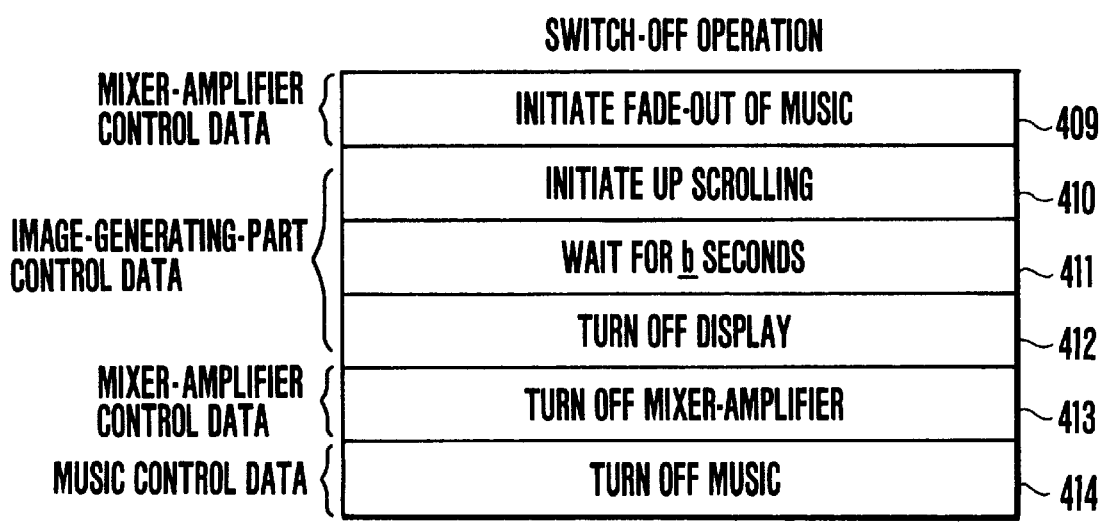

FIGS. 4(A) and 4(B) show different examples of the control data explained in connection with FIG. 2(B).

FIG. 4(A) represents data which are used during a switch-on operation. In FIG. 4(A), data 401 to 406 are used for controlling the image generating part 15, data 407 for controlling music, and data 408 for controlling the mixer-amplifier 19.

Referring to FIG. 4(A), a display position for a title is set in the lower part of a picture on the basis of the data 401, and a color for each portion of the title is set on the basis of the data 402. A display is turned on on the basis of the data 403, and up scrolling is initiated on the basis of the data 404. The process waits for a seconds which is the time required for the title to move to a predetermined position, on the basis of the data 405.

When the data 406 is reached, the scrolling is stopped, and music is started on the basis of the data 407 and the mixer-amplifier 19 is turned on on the basis of the data 408.

Thus, the title and the music are combined with a recorded image and a recorded sound, respectively.

FIG. 4(B) represents data which are used during a switch-off operation. In FIG. 4(B), data 410 to 412 are used for controlling the image generating part 15, data 414 for controlling music, and data 409 and 413 for controlling the mixer-amplifier 19.

Referring to FIG. 4(B), fade-out of the music in the mixer-amplifier 19 is initiated on the basis of the data 409.

Then, up scrolling of the title is initiated on the basis of the data 410, and the process waits (b seconds) until the title image disappears from the picture, on the basis of the data 411.

When the data 412 is reached, the display of the title is turned off. The mixer-amplifier 19 is turned off on the basis of the data 413, and the music is turned off on the basis of the data 414.

Figure 5A:
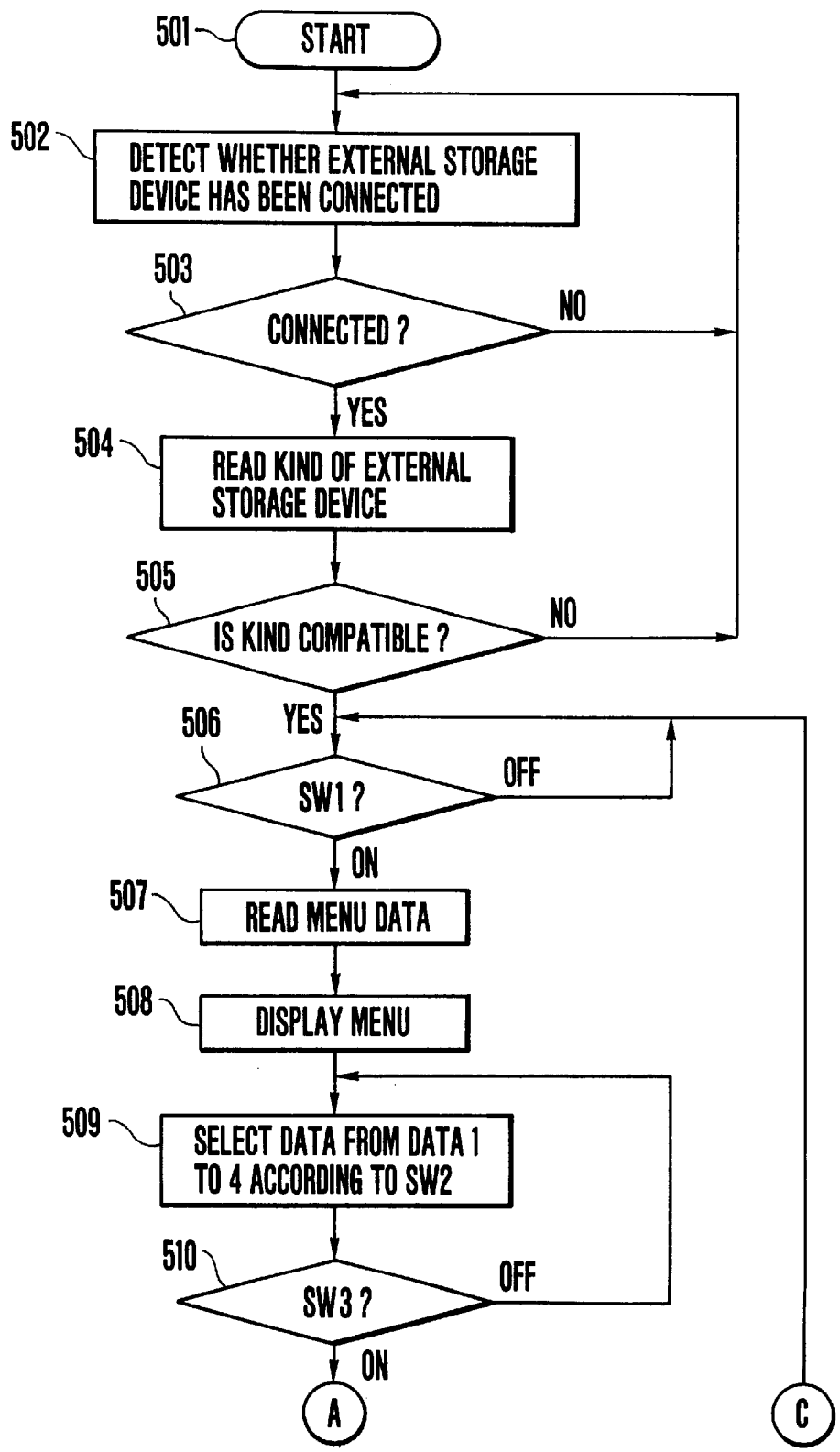
FIGS. 5(A) to 5(C) are operational flowcharts of a control part 11 in the first embodiment.
Figure 5B:
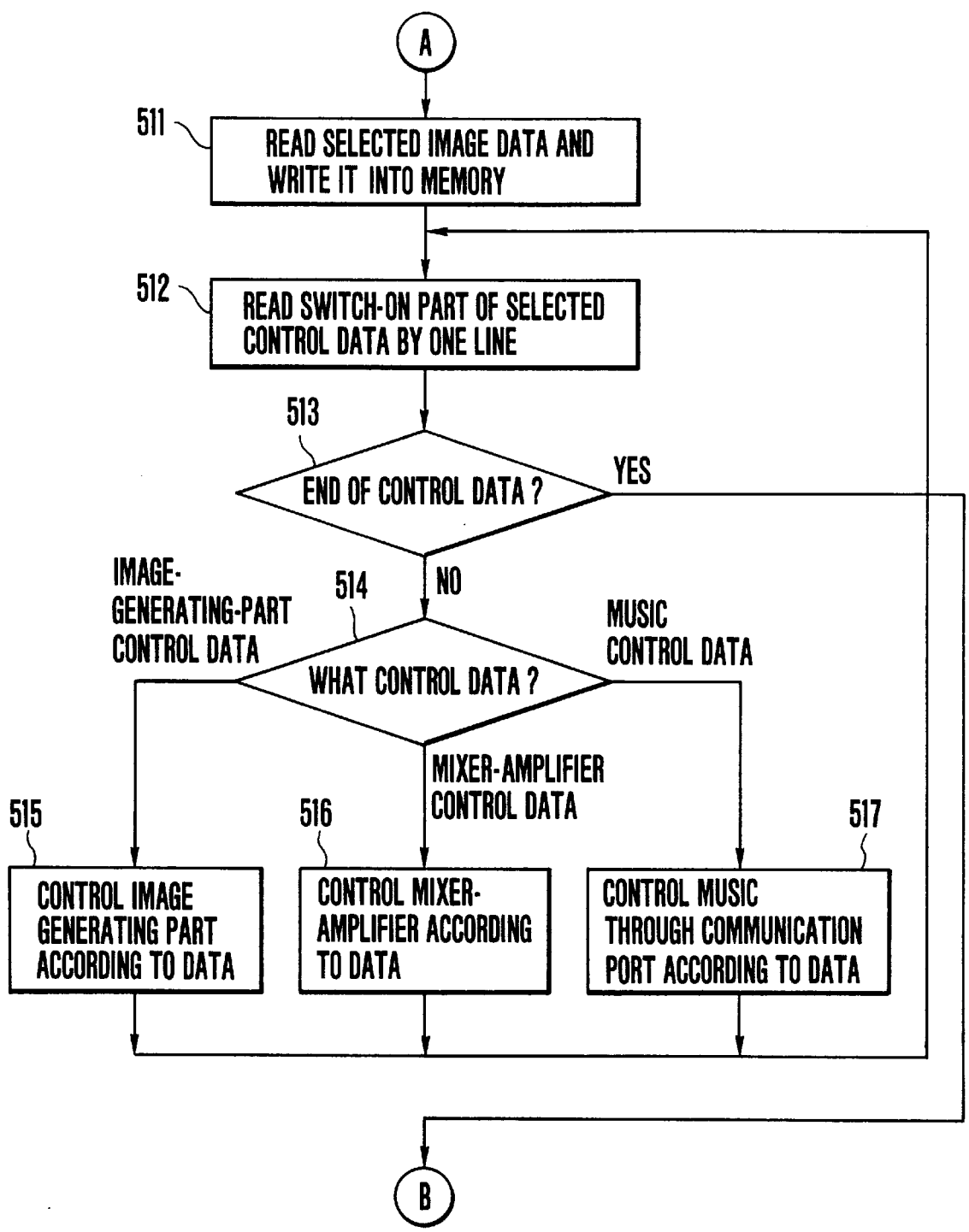
Figure 5C:
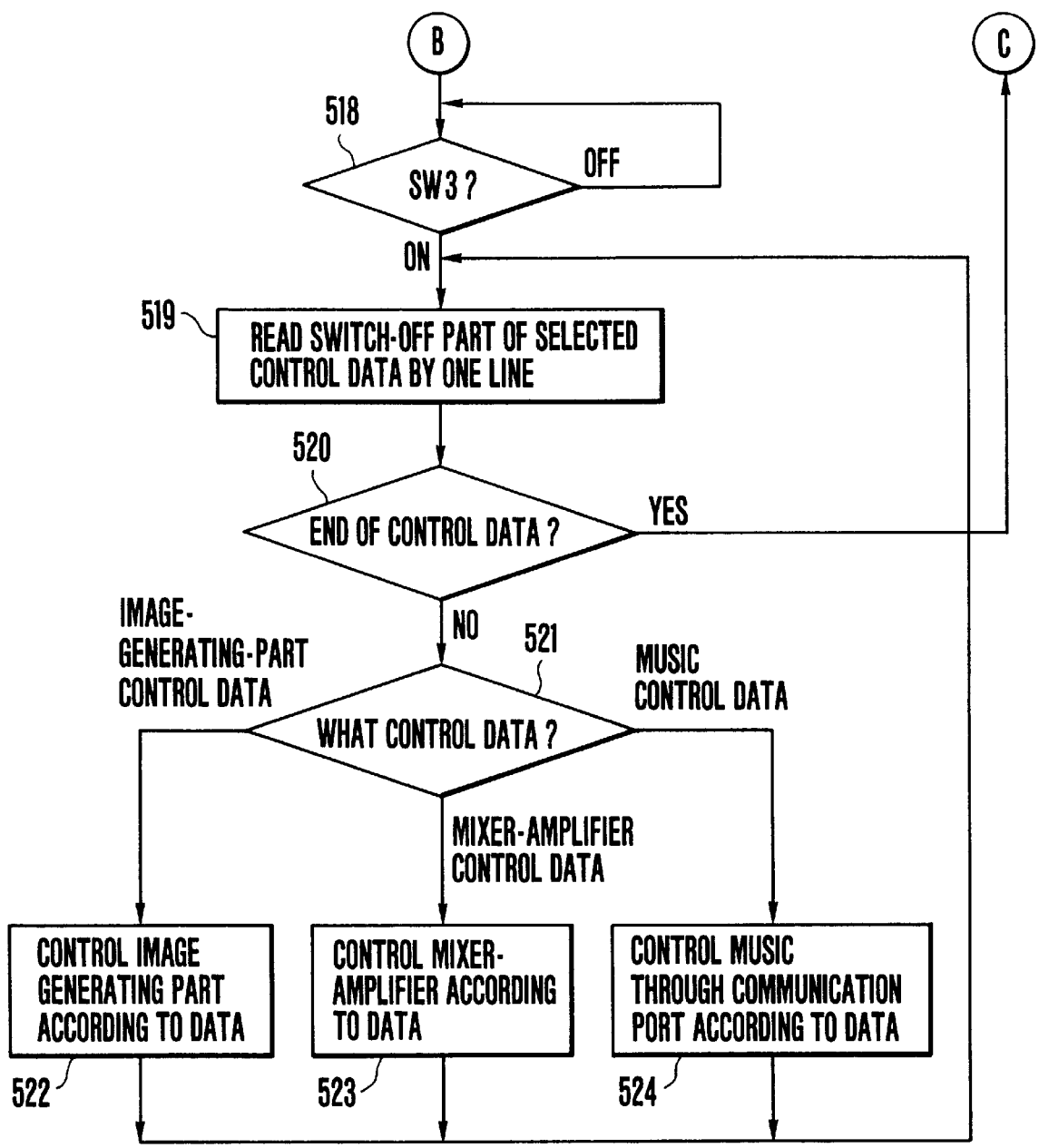

FIGS. 5(A) to 5(C) are flowcharts showing the operation of the aforesaid control part 11 shown in FIG. 1.

Referring to FIG. 5(A), after the process is started in Step 501, whether the external storage device 9 has been connected is detected in Step 502.

This detection is performed as follows: the terminal voltage of the connecting part 10 is measured and if the voltage is not lower than a predetermined level, it is determined that the external storage device 9 has been connected.

Then, if it is determined in Step 503 that the external storage device 9 has not been connected, the process returns to Step 502, and the aforesaid detection operation is repeated until the external storage device 9 is connected. If it is determined in Step 503 that the external storage device 9 has been connected, the process proceeds to Step 504, where data indicative of the kind of the connected external storage device 9 is read from a header supplied therefrom. If no compatibility with the kind of the connected external storage device 9 is obtained in Step 505, the process returns to Step 502.

If compatibility with the kind of the connected external storage device 9 is obtained, it is determined in Step 506 whether SW1 (the switch 12 in FIG. 1) is on or off. If SW1 is off, the process returns to Step 506. If SW1 is on, the process proceeds to Step 507, where menu data is read. In step 508, a menu picture corresponding to the read menu data is displayed in the EVF 21.

Then, in Step 509, SW2 (the switch 13 in FIG. 1) is operated to select from any of the data 1 to 4 displayed on the menu picture. If it is determined in Step 510 that SW3 (the switch 14 in FIG. 1) has been pressed, image data corresponding to the data selected in Step 511 of FIG. 5(B) is read from the external storage device 9 and is then written into the memory 16. If it is determined that SW3 has not been pressed, the process returns to Step 509.

In Step 512, a switch-on part of control data which corresponds to the data selected in Step 509 is read by one line.

If it is determined in Step 513 that the end of the control data has not been reached, the contents of the control data are identified in Step 514. In the case of image-generating-part control data, the process proceeds to Step 515, where the image generating part 15 is controlled in accordance with the image-generating-part control data, and the process returns to Step 512. In the case of mixer-amplifier control data, the process proceeds to Step 516, where the mixer-amplifier 19 is controlled in accordance with the mixer-amplifier control data, and the process returns to Step 512. In the case of music control data, the process proceeds to Step 517, where the control circuit 107 in the external storage device 9 is controlled over the communication port 103 in accordance with the music control data, thereby performing control of the music. Then, the process returns to Step 512.

If it is determined in Step 513 that the end of the control data has been reached, the process proceeds to Step 518 of FIG. 5(C), where the state of SW3 is read. This reading operation is repeated until the ON state of SW3 is detected. If the ON state is detected, a switch-off part of the control data which corresponds to the data selected in Step 509 is read by one line.

If it is determined in Step 520 that the end of the control data has not been reached, the contents of the control data are identified in Step 521. In the case of image-generating-part control data, the process proceeds to Step 522, where the image generating part 15 is controlled in accordance with the image-generating-part control data, and the process returns to Step 519. In the case of mixer-amplifier control data, the process proceeds to Step 523, where the mixer-amplifier 19 is controlled in accordance with the mixer-amplifier control data, and the process returns to Step 519.

In the case of music control data, the process proceeds to Step 524, where the control circuit 107 in the external storage device 9 is controlled over the communication port 103 in accordance with the music control data, thereby performing control of the music. Then, the process returns to Step 519.

If the end of the control data is detected in Step 520, the process returns to Step 506 and the above-described operation is repeated.

As described above, in the video camera system according to the first embodiment, image data, sound data and control data are held in the external storage device which is removably attachable to a video camera body. The image data and the sound data are used for forming an image signal and an audio signal, respectively, so that the image signal is combined with a video signal formed in the video camera body and/or so that the audio signal is combined with an audio signal formed in the video camera body. The control data is used for controlling such a combining operation. Accordingly, it is possible to combine one image signal with another image signal, and/or one audio signal with another audio signal, by attaching the external storage device to the video camera body without any special connecting operation. In addition, it is possible to aid development of a system with reduced size and weight.

The above-described embodiment is arranged such that a title image signal generated by the image generating part 15 is combined with a photographed video signal corresponding to a photographed image by the combining circuit 6 provided on the input side of the VTR part 7. However, the system may also be arranged so that such a title image can be combined with a video signal reproduced by the VTR part 7 on the output side thereof or so that a title image and a video signal can be combined on either of the input and output sides of the VTR part 7.

A similar arrangement can also be utilized for audio signals. For example, the system may be arranged so that an audio signal supplied from the external storage device 9 can be combined with an audio signal reproduced by the VTR part 7 or so that both audio signals can be combined on either of the input and output sides of the VTR part 7.

Although such an audio signal has been referred to as "music", the kind of audio signal is not limited thereto, and a different kind of sound signal may be used, such as sound effect, composite sound or digital composite sound.

In addition, the menu picture displayed in the EVF 21 is not limited to the example used in the first embodiment. For example, the mode of operation of a connected external storage device and menu data contained in the external storage device may be displayed. Although the first embodiment is arranged to display the menu picture by means of an EVF, it is also possible to achieve such display by using another kind of display device such as a liquid-crystal display device.

Although the first embodiment has been described with reference to the case where a video signal and an audio signal which are formed in a video camera are employed as information signals, the range of application of the present invention is not limited to such a case.

As is apparent from the foregoing description, in accordance with the first embodiment, it is possible to provide an information signal controlling system in which one information signal such as a video signal or an audio signal can be combined with another information signal such as an image signal or an audio signal by a simple operation.

Figure 6:
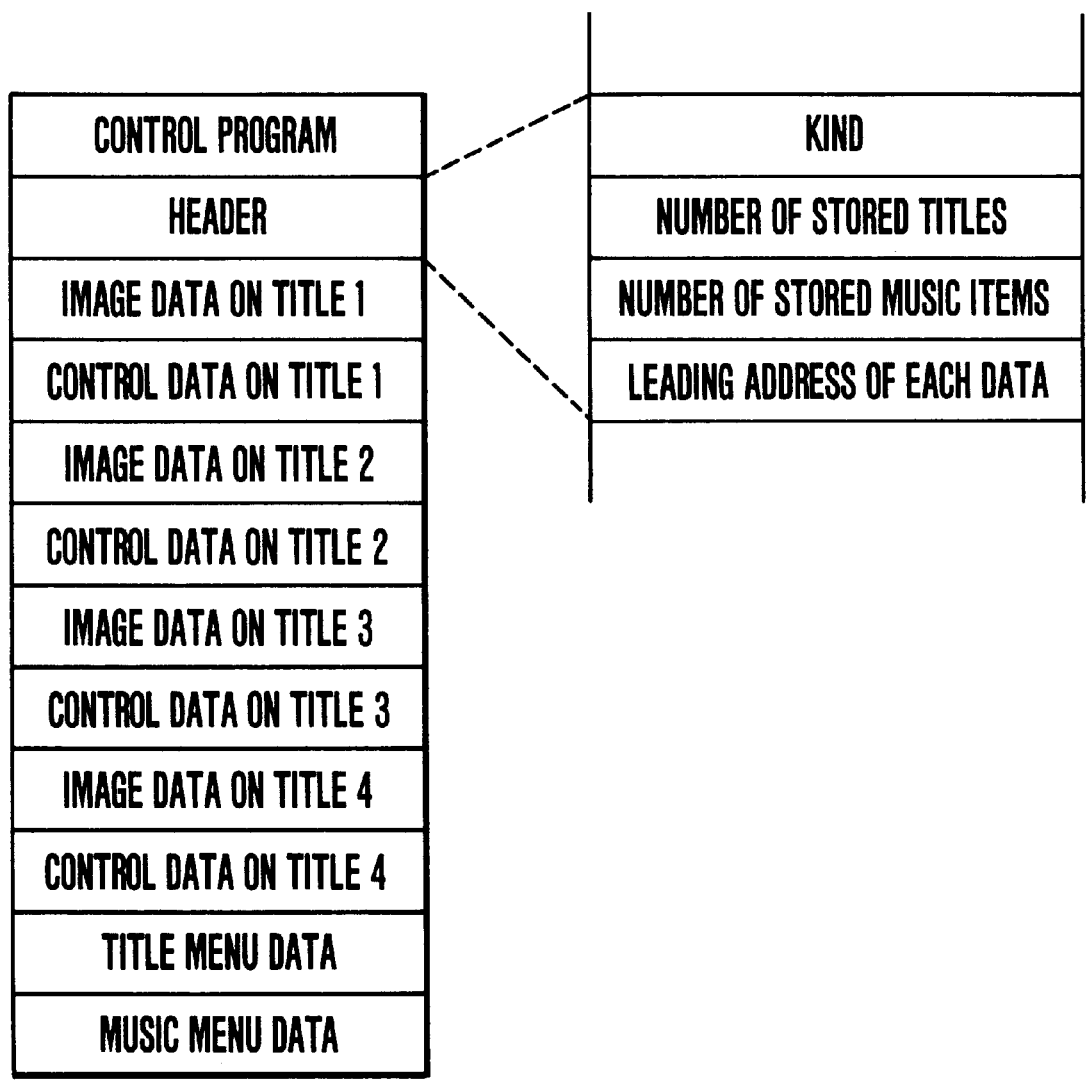
FIG. 6 is a view showing the contents of data held in a ROM 101 of the external storage device 9 for a video camera system to which a second embodiment of the present invention is applied.

FIG. 6 is a view showing the contents of data held in the ROM 10 of FIG. 2 in a video camera system to which a second embodiment of the present invention is applied.

As shown in FIG. 6, a control program for carrying out the aforesaid communication, interpretation of commands, reading of data, control of the I/O port 104, and so on, is stored at a leading address part. The control program is followed by a header which contains data such as the kind of external storage device, the number of titles stored therein and the leading address of each stored data. The header is followed by image data on a title 1, control data on the title 1, image data on a title 2, control data on the title 2, image data on a title 3, control data on the title 3, image data on a title 4, and control data on the title 4. These data are stored in that order at corresponding address parts, as shown in FIG. 6. Data for displaying a menu of the titles and data for displaying a menu of music items are respectively stored at address parts that follow.

FIGS. 7(A) to 7(D) show selecting menu pictures which are selectively displayed in the EVF 21 when the external storage device 9 having the ROM 101, which holds the data shown in FIG. 6, is connected to the body 1.

FIG. 7(A) shows a selecting menu picture for selecting an operating mode from among "A" (operating mode for titles only), "B" (operating mode for music only), and "C" (simultaneous operating mode for both titles and music).

The arrow shown on the left of FIG. 7(A) indicates an operating mode which has presently been selected.

FIG. 7(B) shows a title-selecting menu picture which is displayed when "A" (operating mode for titles only) is selected in the menu of FIG. 7(A).

As shown in FIG. 7(B), "TITLE" which indicates that the operating mode for titles only has been selected is displayed at the top of the menu picture, and the respective names of titles represented by the title menu data held in the ROM 101 in the microcomputer 100 in the external storage device 9 are displayed below "TITLE".

FIG. 7(C) shows a music-selecting menu picture which is displayed when "B" (operating mode for music only) is selected in the menu of FIG. 7(A).

As shown in FIG. 7(C), "MUSIC", which indicates that the operating mode for music only has been selected, is displayed at the top of the menu picture, and the respective names of music items represented by the music menu data held in the ROM 101 are displayed below "MUSIC".

FIG. 7(D) shows a title-and-music selecting menu picture which is displayed when the simultaneous operating mode for both titles and music is selected in the menu of FIG. 7(A).

As shown in FIG. 7(D), "TITLE & MUSIC", which indicates that the simultaneous operating mode for both titles and music has been selected, is displayed at the top of the menu picture, and the names of the titles and those of the music items, which are respectively represented by the title menu data and the music menu data held in the ROM 101, are displayed below "TITLE & MUSIC".

The titles and the music items are displayed as predetermined combinations, such as a combination of the title "AAAA" and the music item "EEEE" as shown in FIG. 7(D). For example, combinations which are frequently used may be preferably displayed like a combination of a title representative of Christmas and a Christmas song.

Figure 8A:
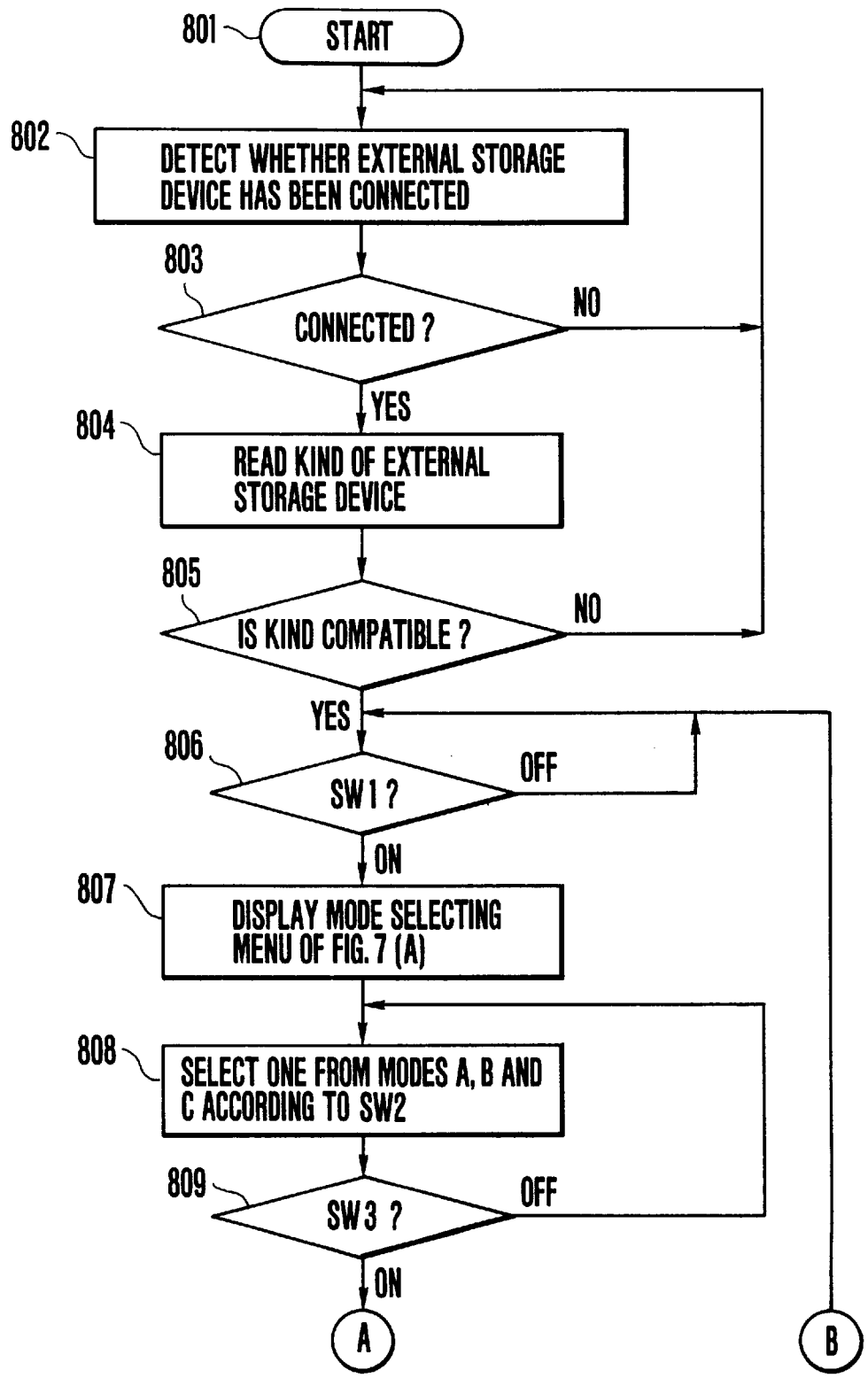
FIGS. 8(A) and 8(B) are operational flowcharts of the control part 11 in the second embodiment.
Figure 8B:
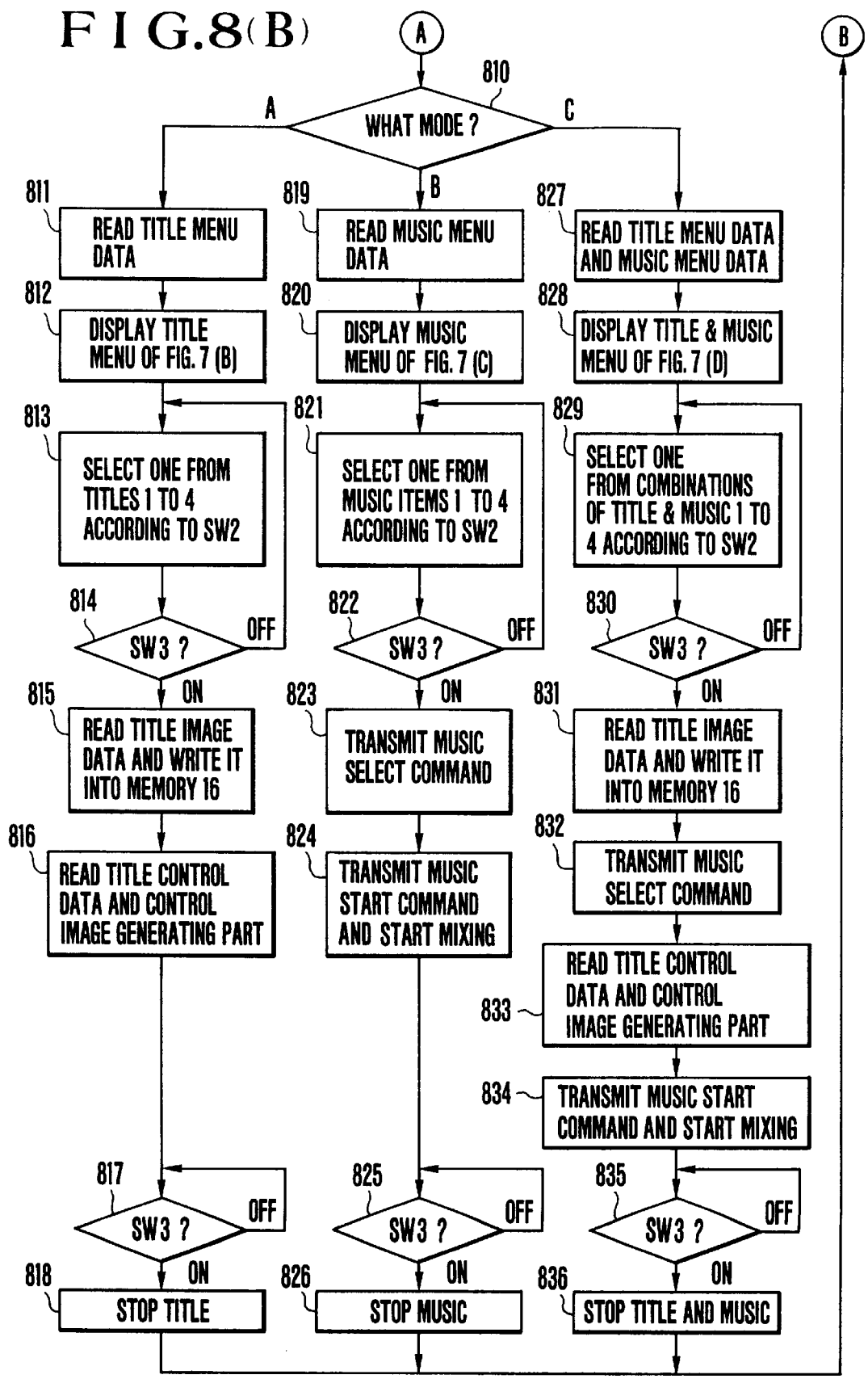

FIGS. 8(A) and 8(B) are flowcharts for explaining the operation of the control part 11 shown in FIG. 1.

Referring to FIG. 8(A), after the process is started in Step 801, whether the external storage device 9 has been connected is detected in Step 802.

This detection is performed as follows: the terminal voltage of the connecting part 10 is measured and if the voltage is not lower than a predetermined level, it is determined that the external storage device 9 has been connected.

Then, if it is determined in Step 803 that the external storage device 9 has not been connected, the process returns to Step 802, and the aforesaid detection operation is repeated until the external storage device 9 is connected. If it is determined in Step 803 that the external storage device 9 has been connected, the process proceeds to Step 804, where data indicative of the kind of the connected external storage device 9 is read from a header supplied therefrom. If no compatibility with the kind of the connected external storage device 9 is obtained in Step 805, the process returns to Step 802.

If compatibility with the kind of the external storage device 9 is obtained, it is determined in Step 806 whether SW1 (the switch 12 in FIG. 1) is on or off. If SW1 is off, the process returns to Step 806. If SW1 is on, the process proceeds to Step 807, where a mode-selecting menu picture (refer to FIG. 7(A)) is displayed in the EVF 21. In Step 808, SW2 (the switch 13 in FIG. 1) is operated to select from any of the operating modes A, B and C displayed on the menu picture, that is, the operating mode for titles only, the operating mode for music only, and the operating mode for both titles and music. If it is determined in Step 809 that SW3 (the switch 14 in FIG. 1) is on, the process proceeds to Step 810 of FIG. 8(B). If it is determined that SW3 is off, the process returns to Step 808.

In Step 810 of FIG. 8(B), the flow branches into three paths in accordance with the operating mode selected in Step 808.

If the operating mode A is selected, the title menu data is read in Step 811 and the title menu picture (refer to FIG. 7(B)) is displayed in the EVF 21 in Step 812. In Step 813, SW2 (the switch 13 in FIG. 1) is operated to select any of the titles 1 to 4 displayed in the title menu picture. If it is determined in Step 814 that SW3 (the switch 14 in FIG. 1) is off, the process returns to Step 813. If it is determined that SW3 is on, the process proceeds to Step 815.

In Step 815, selected title image data is read from the external storage device 9 and is then written into the memory 16. In Step 816, title control data is read, and the image generating part 15 is controlled in accordance with the title control data, thereby carrying out the operation of displaying the desired title image. In Step 817, the state of SW3 (the switch 14 in FIG. 1) is detected, and this detection is repeated until SW3 is turned on. If the ON state of SW3 is detected, the process proceeds to Step 818, where the image generating part 15 is controlled to stop the display of the title image. The process returns to Step 806, and the above-described operation is repeated.

If the operating mode B is selected, the music menu data is read in Step 819 and the music menu picture (refer to FIG. 7(C)) is displayed in the EVF 21 in Step 820. In Step 821, SW2 (the switch 13 in FIG. 1) is operated to select any of the music items 1 to 4 displayed in the title menu picture. If it is determined in Step 822 that SW3 (the switch 14 in FIG. 1) is off, the process returns to Step 821. If it is determined that SW3 is on, the process proceeds to Step 823.

In Step 823, a music select command and the selected music number are transmitted and, in Step 824, a music start command is transmitted and also a control signal for initiating mixing are transmitted to the mixer-amplifier 19, thereby causing it to initiate a music-mixing operation. In Step 825, the state of SW3 (the switch 14 in FIG. 1) is detected. This detection is repeated until the ON state of SW3 is detected. If the ON state is detected, the process proceeds to Step 826, where a music stop command is transmitted and a control signal for bringing mixing to an end is transmitted to the mixer-amplifier 19, thereby causing it to stop the music-mixing operation. The process returns to Step 806, and the above-described operation is repeated.

If the operating mode C is selected, both the music menu data and the title menu data are read in Step 827 and a menu picture for the simultaneous operating mode for both titles and music (refer to FIG. 7(D)) is displayed in the EVF 21 in Step 828. In Step 829, SW2 (the switch 13 in FIG. 1) is operated to select any of the combinations 1 to 4 of titles and music items that are displayed in the menu picture. If it is determined in Step 830 that SW3 (the switch 14 in FIG. 1) is off, the process returns to Step 829. If it is determined that SW3 is on, the process proceeds to Step 831.

In Step 831, selected title image data are read from the external storage device 9 and are then written into the memory 16. In Step 832, a music select command and the selected music number are transmitted and, in Step 833, title control data are read and the image generating part 15 is controlled on the basis of the title control data, whereby a title-displaying operation is carried out. In Step 834, a music start command is transmitted and also a control signal for initiating mixing is transmitted to the mixer-amplifier 19, thereby causing it to initiate a music-mixing operation. In Step 835, the state of SW3 (the switch 14 in FIG. 1) is detected. This detection is repeated until the ON state of SW3 is detected. If the ON state is detected, the process proceeds to Step 836, where the image generating part 15 is controlled to stop the display of the title, and a music stop command is transmitted and also a control signal for bringing mixing to an end is transmitted to the mixer-amplifier 19, thereby causing it to stop the music-mixing operation. The process returns to Step 806, and the above-described operation is repeated.

As described above, in the video camera system according to the second embodiment, image data, sound data and control data are held in the external storage device which is removably attachable to a video camera body. The image data and the sound data are used for forming an image signal and an audio signal, respectively, so that the image signal and the audio signal are respectively combined with a video signal and an audio signal both of which are formed in the video camera body or so that either one of the image signal and the audio signal is combined with a corresponding one of the video and audio signals formed in the video camera body. The control data has a mode for effecting only an image combining operation, a mode for effecting only a sound combining operation, and a mode for effecting both an image combining operation and a sound combining operation, so that the aforesaid combining operation is controlled on the basis of any of the three modes. Accordingly, various kinds of image signals and those of audio signals can be selectively respectively combined with a video signal and an audio signal through a simple operation by attaching the external storage device to the video camera body without any special connecting operation, whereby a variety of effects can be enjoyed. In addition, it is possible to aid development of a system with reduced size and weight.

The above-described second embodiment is arranged such that a title image signal generated by the image generating part 15 is combined with a photographed video signal corresponding to a photographed image by the combining circuit 6 provided on the input side of the VTR part 7. However, the system may also be arranged so that such a title image can be combined with a video signal reproduced by the VTR part 7 on the output side thereof or so that a title image and a video signal can be combined on either of the input and output sides of the VTR part 7.

A similar arrangement can also be utilized for audio signals. For example, the system may be arranged so that an audio signal reproduced by the VTR part 7 can be combined with an audio signal supplied from the external storage device 9 or so that both audio signals can be combined on either of the input and output sides of the VTR part 7.

Although such an audio signal has been referred to as "music", the kind of audio signal is not limited thereto, and a different kind of sound signal may be used, such as sound effect, composite sound or digital composite sound.

In addition, the menu picture displayed in the EVF 21 is not limited to the example used in the second embodiment. For example, the mode of operation of a connected external storage device and menu data contained in the external storage device may be displayed. Although the second embodiment is arranged to display the menu picture by means of an EVF, it is also possible to achieve such display by using another kind of display device such as a liquid-crystal display device.

Although the second embodiment has been described with reference to the case where a video signal and an audio signal which are formed in a video camera are employed as information signals, the range of application of the present invention is not limited to such a case.

As is apparent from the foregoing description, in accordance with the second embodiment, it is possible to provide an information signal controlling system in which one information signal such as a video signal or an audio signal can be combined with another information signal such as an image signal or an audio signal by a simple operation.

Figure 9A:
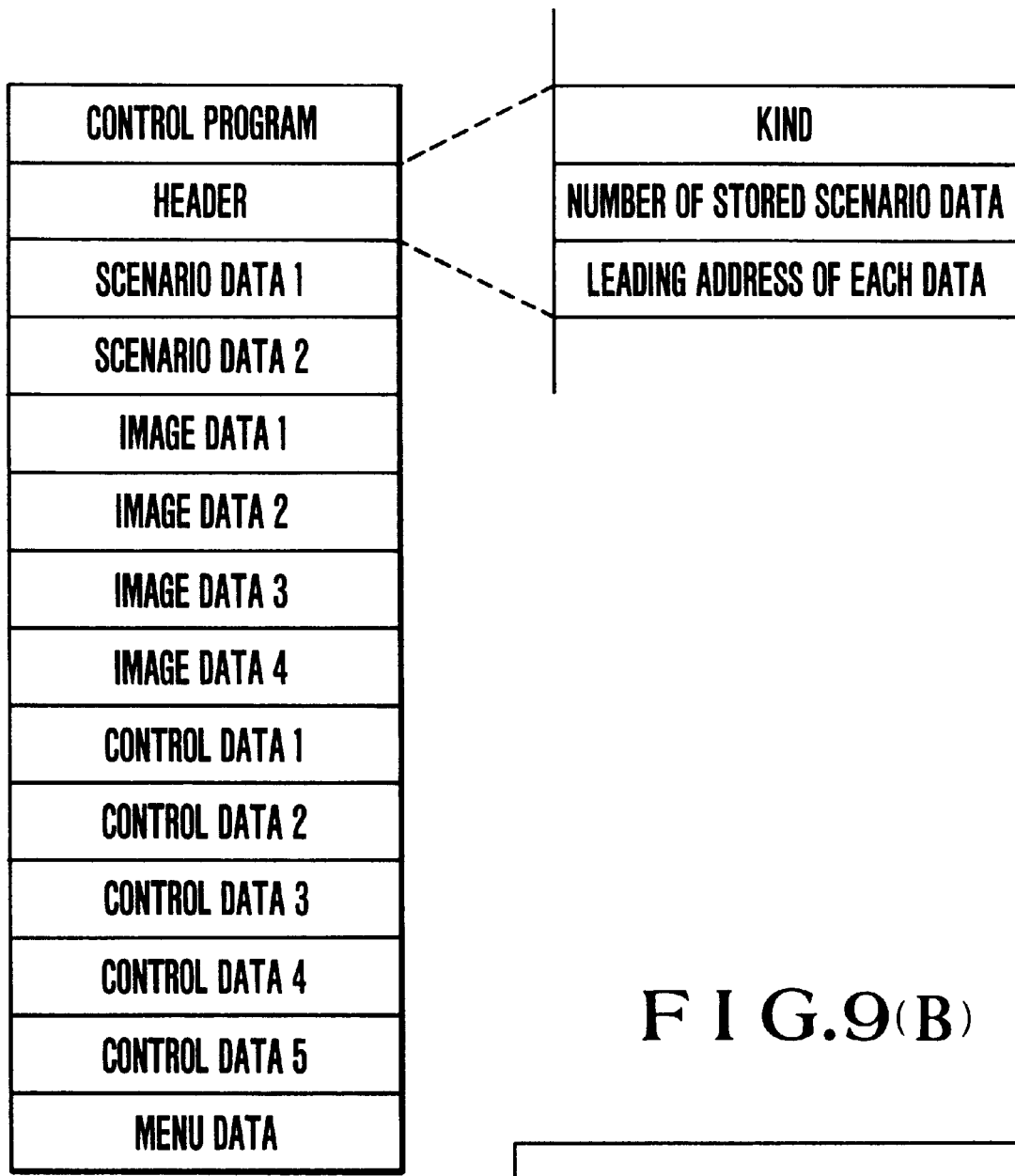
FIGS. 9(A) and 9(B) are explanatory views of the arrangement and operation of the external storage device 9 for a video camera system to which a third embodiment of the present invention is applied.

FIG. 9(A) is a view showing the contents of data held in the ROM 101 of FIG. 2(A) in a video camera system to which a third embodiment of the present invention is applied.

As shown in FIG. 9(A), a control program for carrying out the aforesaid communication, interpretation of commands, reading of data, control of the I/O port 104, and so on, is stored at a leading address part. The control program is followed by a header which contains data such as the kind of external storage device, the number of scenario data stored therein and the leading address of each stored data. The header is followed by scenario data 1 and 2 each containing the basic order of combining an image signal and an audio signal with a video signal and an audio signal, respectively, image data 1 to 4, and control data 1 to 5. These data are stored in that order at corresponding address parts, as shown in FIG. 9(A). Data for displaying a menu are stored at address parts that follow.

Figure 9B:
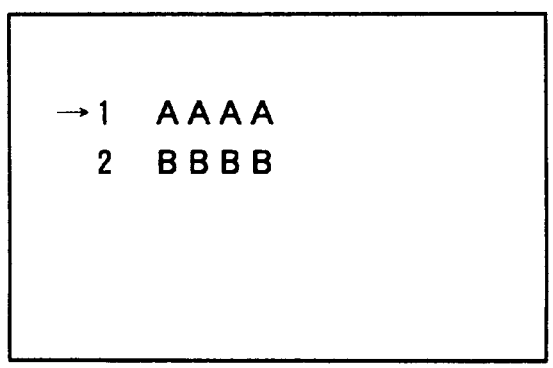

FIG. 9(B) shows a display picture appearing in the EVF 21 when the external storage device 9 having the ROM 101 which holds the data shown in FIG. 9(A) is connected to the body 1.

In FIG. 9(B), "1" and "2" indicate the numbers of respective scenario data, and "AAAA" and "BBBB" indicate the names and kinds of data which are displayed in the EVF 21 by the control part 11 according to the menu data shown in FIG. 9(A).

The arrow shown in FIG. 9(B) indicates that the pointed scenario data is presently selected.

FIGS. 10(A) and 10(B) show an example of the control data shown in FIG. 9(A) and an example of control data, respectively.

FIG. 10(A) represents the scenario data. First, the control data 1 are called on the basis of data 1001, then the control data 2 are called on the basis of data 1002, then the control data 3 are called on the basis of data 1003, and subsequently the process returns to an address shown at "START" in FIG. 10(A) on the basis of data 1004. The above-described operation is repeated.

FIG. 10(B) shows the control data 1 by way of example. In FIG. 10(B), data 1005 to 1011, 1014 and 1016 to 1018 are used for controlling the image generating part 15, data 1012 and 1020 are used for controlling music, and data 1013 and 1019 are used for controlling the mixer-amplifier 19.

Referring to FIG. 10(B), first, image data 1 is read into the memory 16 on the basis of the data 1005.

Then, a display position for a title is set at the lower end of a picture on the basis of the data 1006, and a color for each portion of the title is set on the basis of the data 1007. A display is turned on on the basis of the data 1008, and up scrolling is initiated on the basis of the data 1009. The process waits for a seconds which is the time required for the title to move to a predetermined position, on the basis of the data 1010.

When the data 1011 are reached, the scrolling is stopped.

Then, music, which is started on the basis of the data 1012 and the mixer-amplifier 19, is turned on on the basis of the data 1013.

Thus, the title and the music are combined with a recorded video image and a recorded sound, respectively.

After the process waits for b seconds, fade-out of the music in the mixer-amplifier 19 is initiated on the basis of the data 1015.

Then, up scrolling of the title is initiated on the basis of the data 1016, and the process waits (c seconds) until the title image disappears from the picture, on the basis of the data 1017.

When the data 1018 is reached, the display of the title is turned off. The mixer-amplifier 19 is turned off on the basis of the data 1019, and the music is turned off on the basis of the data 1020.

Figure 11A:
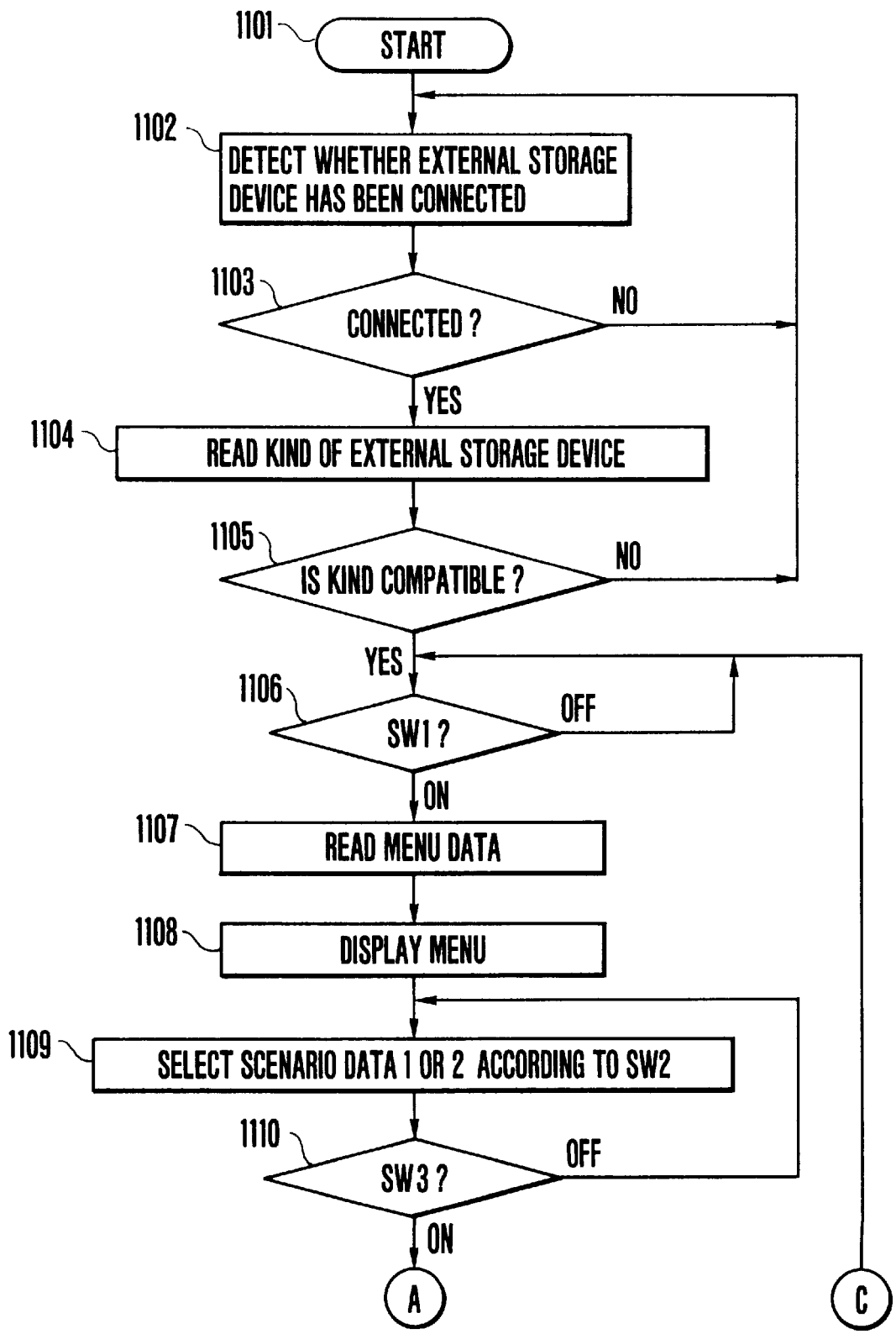
FIGS. 11(A) and 11(B) are operational flowcharts of the control part 11 in the third embodiment.
Figure 11B:
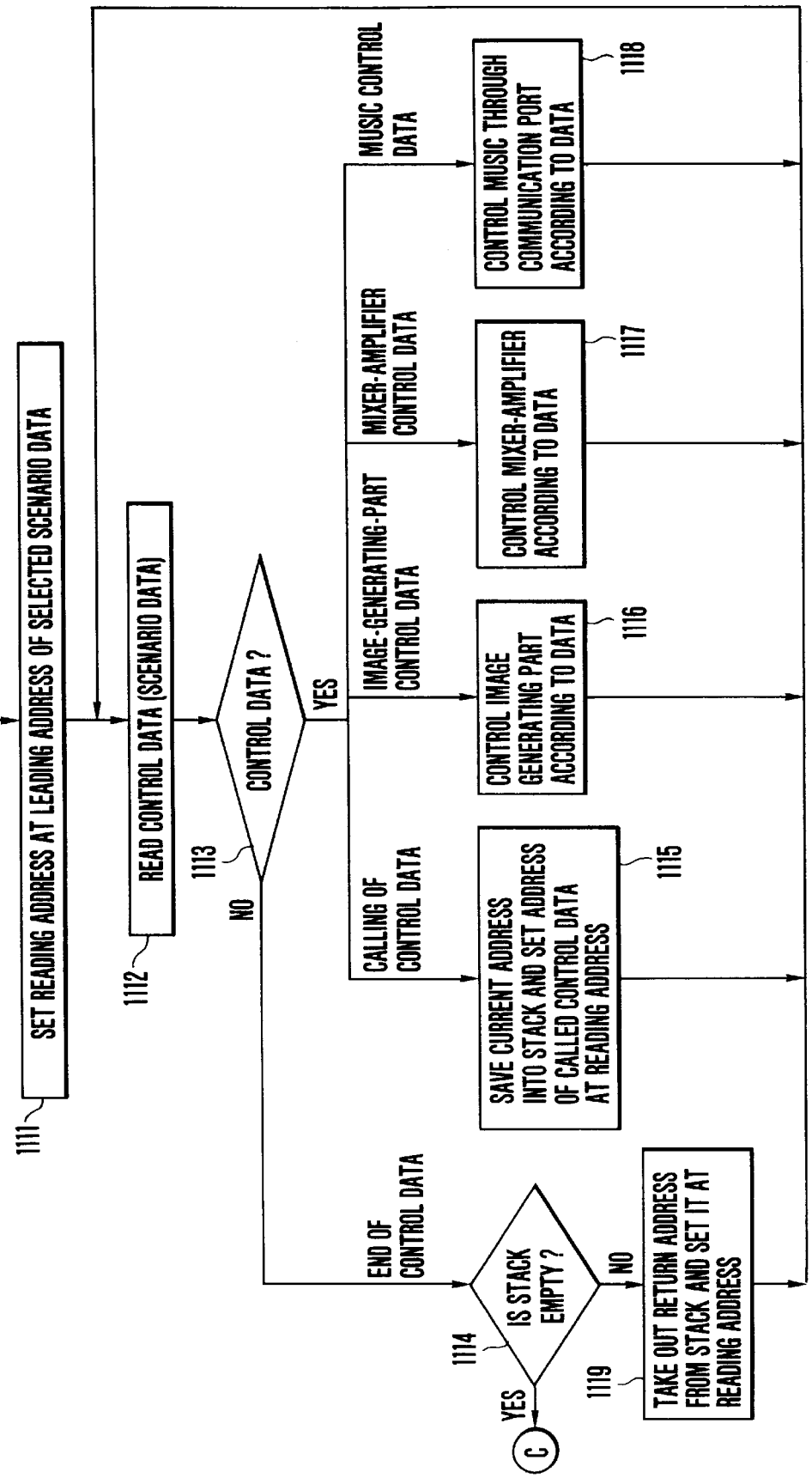

FIGS. 11(A) to 11(B) are flowcharts showing the operation of the aforesaid control part 11 shown in FIG. 1.

Referring to FIG. 11(A), after the process is started in Step 1101, whether the external storage device 9 has been connected is detected in Step 1102.

This detection is performed as follows: the terminal voltage of the connecting part 10 is measured and if the voltage is not lower than a predetermined level, it is determined that the external storage device 9 has been connected.

Then, if it is determined in Step 1103 that the external storage device 9 has not been connected, the process returns to Step 1102, and the aforesaid detection operation is repeated until the external storage device 9 is connected. If it is determined in Step 1103 that the external storage device 9 has been connected, the process proceeds to Step 1104, where data indicative of the kind of the connected external storage device 9 is read from a header supplied therefrom. If no compatibility with the kind of the connected external storage device 9 is obtained in Step 1105, the process returns to Step 1102.

If compatibility with the kind of the connected external storage device 9 is obtained, it is determined in Step 1106 whether SW1 (the switch 12 in FIG. 1) is on or off. If SW1 is off, the process returns to Step 1106. If SW1 is on, the process proceeds to Step 1107, where menu data are read. In Step 1108, a menu picture corresponding to the read menu data is displayed in the EVF 21.

Then, in Step 1109, SW2 (the switch 13 in FIG. 1) is operated to select either one of the scenario data 1 and 2 displayed on the menu picture. It is determined in Step 1110 whether SW3 (the switch 14 in FIG. 1) has been pressed. If it is determined that SW3 has not been pressed, the process returns to Step 1109. If it is determined that SW3 has been pressed, the process returns to Step 1111 of FIG. 11(B), where a reading address for data is set at the leading address of the selected scenario data.

In Step 1112, the scenario data at the address set in Step 1111 is read by one line.

If image-generating-part control data is detected in Step 1113, the process proceeds to Step 1116, where the image generating part 15 is controlled in accordance with the image-generating-part control data, and the process returns to Step 1112. If mixer-amplifier control data are detected in Step 1113, the process proceeds to Step 1117, where the mixer-amplifier 19 is controlled in accordance with the mixer-amplifier control data, and the process returns to Step 1112. If music control data are detected in Step 1113, the process proceeds to Step 1118, where the control circuit 107 in the external storage device 9 is controlled over the communication port 103 in accordance with the music control data, thereby performing control of the music. Then, the process returns to Step 1112.

If a call for the control data is detected in Step 1113, a so-called subroutine call is performed, that is to say, the current address is saved into a stack and the address of the called control data is set at the next reading address.

If it is determined in Step 1113 that the end of the control data has been reached, the process proceeds to Step 1114, where it is determined whether the stack is empty. If it is determined that the stack is empty, the process returns to Step 1106 of FIG. 11(A), and the above-described operation is repeated. If the stack is not empty, a return address is taken from the stack and is set at the next reading address. The process returns to Step 1112, and the above-described operation is repeated.

As described above, in the video camera system according to the third embodiment, image data, sound data and scenario data are held in the external storage device which is removably attachable to a video camera body. The image data and the sound data are used for forming an image signal and an audio signal, respectively, so that the image signal and the audio signal are respectively combined with a video signal and an audio signal both of which are formed in the video camera body. The scenario data indicate the order of an image-combining operation and that of a sound-combining operation. Accordingly, by attaching the external storage device to the video camera body without any special connecting operation, it is possible to combine one image signal with another image signal, and one audio signal with another audio signal, in a predetermined order or combination through a simple operation. In addition, it is possible to aid development of a system with reduced size and weight.

The above-described third embodiment is arranged such that a title image signal generated by the image generating part 15 is combined with a photographed video signal corresponding to a photographed image by the combining circuit 6 provided on the input side of the VTR part 7. However, the system may also be arranged so that such a title image can be combined with a video signal reproduced by the VTR part 7 on the output side thereof or so that a title image and a video signal can be combined on either of the input and output sides of the VTR part 7.

A similar arrangement can also be utilized for audio signals. For example, the system may be arranged so that an audio signal reproduced by the VTR part 7 can be combined with an audio signal supplied from the external storage device 9 or so that both audio signals can be combined on either of the input and output sides of the VTR part 7.

Although such an audio signal has been referred to as "music", the kind of audio signal is not limited thereto, and a different kind of sound signal may be used, such as sound effect, composite sound or digital composite sound.

In addition, the menu picture displayed in the EVF 21 is not limited to the example used in the third embodiment. For example, the mode of operation of a connected external storage device and menu data contained in the external storage device may be displayed. Although the third embodiment is arranged so that the menu picture can be displayed in the EVF, it is also possible to achieve such display by using another kind of display device such as a liquid-crystal display device.

Although the third embodiment has been described with reference to the case where a video signal and an audio signal which are formed in a video camera are employed as information signals, the range of application of the present invention is not limited to such a case.

As is apparent from the foregoing description, in accordance with the third embodiment, it is possible to provide an information signal controlling system which can combine one image signal with another image signal, and/or one audio signal with another audio signal, by a simple operation without a special operation.

What is claimed is:

1. An image signal processing apparatus for processing an image signal using a storage device storing a plurality of second image data each representing a plurality of second images, and a plurality of different scenario data each describing combining sequence of the plurality of second image data, comprising:

image signal generating means for generating a first image signal;

selecting means for selecting a desired scenario data from the plurality of scenario data stored in the storage device;

reading means for reading the selected scenario data selected by said selecting means from the storage device, said reading means also determining the second image data to be read out from the storage device in accordance with the selected scenario data and automatically reading the plurality of second image data in a predetermined order corresponding to the selected scenario data from the storage device; and signal processing means for combining the first image signal generated by said image signal generating means with the second image data read by said reading means in accordance with the selected scenario data.

2. An apparatus according to claim 1, wherein said image signal generating means includes imaging means which images a subject and generates the first image signal.

3. An apparatus according to claim 1, further comprising display means for displaying an information relating to the scenario data read by said reading means.

4. An apparatus according to claim 1, wherein the scenario data is composed of a plurality of control data each describing a processing sequence of the second image data.

5. An apparatus according to claim 1, wherein said second image data represents a title image.

6. An apparatus according to claim 5, wherein said combining means combines the generated second image data so that the title image of the generated second image data scrolls in accordance with the selected scenario data.

7. An apparatus according to claim 1, wherein said combining means automatically determining a combining timing of the second image data with the first image signal in accordance with the selected scenario data.

8. An apparatus according to claim 1, wherein the storage device also stores menu data, said selecting means selecting the desired scenario data using the menu data.

9. An apparatus according to claim 1, further comprising recording means for recording a combined image signal obtained by said signal processing means on a recording medium.

10. A storage device used with an image processing apparatus separate from the storage device, said storage device storing a plurality of second image data each representing a plurality of second images to be combined with a first image signal generated in the image processing apparatus to be combined with a first image signal generated in the image processing apparatus, and a plurality of different scenario data each describing combining sequence of the plurality of second image data, said storage device delivering a selected scenario data selected by the image processing apparatus from the plurality of the scenario data to the image processing apparatus, said storage device automatically delivering a plurality of second image data determined by the image processing apparatus in accordance with the selected scenario data, in a predetermined order corresponding to the selected scenario data, a sequence of combination of the delivered second image data with the first image signal by said image processing apparatus being controlled in accordance with the selected scenario data.

11. A device according to claim 10, wherein said device also stores header information describing addresses of the plurality of second image data and the plurality of scenario data.

12. A device according to claim 10, wherein said device also stores menu information, and wherein the scenario data is selected by said image processing apparatus using the menu information.

13. A device according to claim 10, wherein the plurality of second image data represent title images.

* * * * *

UNITED STATES PATENT AND TRADEMARK OFFICE
CERTIFICATE OF CORRECTION

PATENT NO. : 6,278,486 B1
DATED : August 21, 2001
INVENTOR(S) : Teruo Hieda et al.

Page 1 of 1

It is certified that error appears in the above-identified patent and that said Letters Patent is hereby corrected as shown below:

Column 1,
Line 42, delete "signal" and insert -- signal, --.
Line 43, delete "like" and insert -- like, --.

Column 2,
Line 4, delete "photography" and insert -- photography, --.

Column 3,
Line 47, delete "7(B)" and insert -- 7(D) --.

Column 9,
Line 29, delete ""TITLE" and insert -- "TITLE," --.
Line 30, delete "selected" and insert -- selected, --.

Signed and Sealed this

Fourteenth Day of May, 2002

Attest:

JAMES E. ROGAN
*Attesting Officer*  *Director of the United States Patent and Trademark Office*